US011775051B2

(12) United States Patent
Laaksonen et al.

(10) Patent No.: US 11,775,051 B2
(45) Date of Patent: Oct. 3, 2023

(54) APPARATUS AND ASSOCIATED METHODS FOR PRESENTATION OF PRESENTATION DATA

(71) Applicant: Nokia Technologies Oy, Espoo (FI)

(72) Inventors: Lasse Juhani Laaksonen, Tampere (FI); Antti Johannes Eronen, Tampere (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 49 days.

(21) Appl. No.: 17/435,562

(22) PCT Filed: Feb. 25, 2020

(86) PCT No.: PCT/EP2020/054861
§ 371 (c)(1),
(2) Date: Sep. 1, 2021

(87) PCT Pub. No.: WO2020/187531
PCT Pub. Date: Sep. 24, 2020

(65) Prior Publication Data
US 2022/0066542 A1 Mar. 3, 2022

(30) Foreign Application Priority Data
Mar. 20, 2019 (EP) ..................................... 19164133

(51) Int. Cl.
*G06F 3/01* (2006.01)
*G06F 16/438* (2019.01)
(Continued)

(52) U.S. Cl.
CPC .......... *G06F 3/011* (2013.01); *G06F 16/4393* (2019.01); *G06F 16/587* (2019.01);
(Continued)

(58) Field of Classification Search
CPC .... G06F 3/011; G06F 16/4393; G06F 16/587; G06F 16/55; G06T 19/006;
(Continued)

(56) References Cited

U.S. PATENT DOCUMENTS 10,514,769 B2* 12/2019 Aurongzeb ............. G06F 3/017
11,532,138 B2* 12/2022 Skidmore ................ H04N 5/76
(Continued)

FOREIGN PATENT DOCUMENTS

GB          2545275 A      6/2017
WO     WO-00/70489 A2     11/2000

OTHER PUBLICATIONS

Office action received for corresponding European Patent Application No. 19164133.1, dated Aug. 9, 2022, 7 pages.
(Continued)

*Primary Examiner* — Motilewa Good-Johnson
(74) *Attorney, Agent, or Firm* — Harrington & Smith

(57) ABSTRACT

An apparatus configured to: receive presentation data comprising first and second content for consecutive presentation, the first and second content associated with respective first and second spatial regions and a respective first and second presentation location; determine if the current location of a presenter user is within at least one of the first or second spatial region; if the presenter user is within the first spatial region, provide for the presentation of the first content at the first presentation location by a presentation apparatus of a consumer user in virtual reality; if the presenter user is within the second spatial region, provide for the presentation of the second content at the second presentation location by the presentation apparatus; and wherein the presentation of the first and second content is independent of the location of the consumer user.

20 Claims, 5 Drawing Sheets

(51) Int. Cl.
  *G06F 16/587* (2019.01)
  *G06T 19/00* (2011.01)
  *H04L 12/18* (2006.01)
  *H04S 7/00* (2006.01)
(52) U.S. Cl.
  CPC ........ *G06T 19/006* (2013.01); *H04L 12/1813* (2013.01); *H04S 7/30* (2013.01); *G06T 2219/024* (2013.01); *H04S 2400/11* (2013.01); *H04S 2400/15* (2013.01)
(58) Field of Classification Search
  CPC . G06T 2219/024; H04L 12/1813; H04S 7/30; H04S 2400/11; H04S 2400/15
  See application file for complete search history.

(56) References Cited

U.S. PATENT DOCUMENTS

| | | | | |
|---|---|---|---|---|
| 2011/0025818 A1* | 2/2011 | Gallmeier | ............. | G06F 3/0425 348/E7.083 |
| 2015/0117664 A1* | 4/2015 | Mossner | ............ | G01C 21/3679 381/74 |
| 2016/0300388 A1* | 10/2016 | Stafford | ................... | A63F 13/69 |
| 2017/0193704 A1* | 7/2017 | Leppänen | ............... | G06F 3/012 |
| 2017/0236517 A1* | 8/2017 | Yu | ......................... | G06F 40/106 704/235 |
| 2018/0033203 A1* | 2/2018 | Ligameri | .............. | G06F 3/1454 |
| 2019/0180509 A1* | 6/2019 | Laaksonen | .......... | G06F 3/04815 |
| 2020/0175274 A1* | 6/2020 | Laaksonen | ............. | G06V 20/20 |
| 2022/0005281 A1* | 1/2022 | Skidmore | ........ | H04N 5/232933 |
| 2022/0253149 A1* | 8/2022 | Berliner | .................... | G06F 3/14 |
| 2022/0254120 A1* | 8/2022 | Berliner | .................. | G06F 3/033 |

OTHER PUBLICATIONS

Extended European Search Report received for corresponding European Patent Application No. 19164133.1, dated Sep. 27, 2019, 9 pages.

International Search Report and Written Opinion received for corresponding Patent Cooperation Treaty Application No. PCT/EP2020/054861, dated May 4, 2020, 11 pages.

* cited by examiner

APPARATUS AND ASSOCIATED METHODS FOR PRESENTATION OF PRESENTATION DATA

RELATED APPLICATION

This application claims priority to PCT Application No. PCT/EP2020/054861, filed on Feb. 25, 2020 which claims priority to EP Application No. 19164133.1 filed Mar. 20, 2019, the content of each of which is incorporated herein by reference in its entirety.

TECHNICAL FIELD

The present disclosure relates to the field of presentation of virtual, augmented and mixed reality. In particular, it is related to the presentation of presentation data in virtual, augmented and mixed reality, associated apparatus, methods and computer programs.

BACKGROUND

The presentation of virtual reality spaces or environments is becoming common, with content creators providing more and more content for exploration. There is also a separate desire to share ideas and present those ideas as a slideshow-style presentation to others.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising means configured to:
 receive presentation data comprising at least first content and second content for consecutive presentation, the first content and the second content associated with a respective first and second spatial region that comprises a different part of a space and a respective first and second presentation location that comprise a different location in the space;
 receive presenter location information indicative of a current location of a presenter user in the space;
 determine, from the presenter location information, if the current location of the presenter user is within at least one of the first or second spatial region;
 if it is determined that the current location is within the first spatial region, the means are configured to provide signalling to at least one presentation apparatus for the presentation of the first content at the first presentation location by the at least one presentation apparatus, the presentation apparatus configured to present the first content to a consumer user, different to the presenter user, in one of virtual reality or augmented reality;
 if it is determined that the current location is within the second spatial region, the means are configured to provide signalling to the at least one presentation apparatus for the presentation of the second content at the second presentation location by the at least one presentation apparatus, the presentation apparatus configured to present the second content to the consumer user, different to the presenter user, in the one of virtual reality or augmented reality; and
 wherein the presentation of the first content is independent of the location of the consumer users and the presentation of the second content is independent of the location of the consumer users.

Thus, in one or more examples, the presentation data may be compared to a slideshow presentation in which the first content and the second content comprise slides of the slideshow. However, given that the first content and second content are intended for presentation in virtual reality or augmented reality (or any variations thereof), the first and second content may comprise more than a two-dimensional slide and may comprise text, image(s), video(s), audio, three-dimensional models, which may presented, virtually, in three-dimensions, rather than as a two-dimensional representation of a three-dimensional model. It will be appreciated that just as a slideshow may comprise any number of slides, the presentation data may comprise a plurality of instances of content of which the first content and the second content comprise two instances of possibly many instances of content.

In one or more examples, the space comprises a virtual reality space for presentation to the presenter user and the one or more consumer users in virtual reality.

In one or more examples, the respective spatial regions comprise discrete regions of the virtual reality space. In one or more examples, the presenter location information is indicative of a current virtual location in the virtual reality space and is received from a virtual reality apparatus configured to present the virtual reality space for the presenter user. In one or more examples, the virtual reality apparatus is part of a system with the apparatus.

In one or more examples, it will be appreciated that the respective presentation of the first content and the second content by the at least one presentation apparatus comprises the presentation of the first content and second content in response to direction-of-view information indicative that the respective consumer user is looking in the direction of the respective first presentation location and the second presentation location. In examples where the space comprises a virtual reality space, the presentation of the first content and the second content by the at least one presentation apparatus may comprise the inclusion of the first content and the second content in the virtual reality space for viewing by the consumer users when they look in the direction of the respective first presentation location and the second presentation location.

In one or more examples, the at least one presentation apparatus is part of the apparatus.

In one or more examples, the means are configured to, if it is determined that the current location is not within any of the respective spatial regions, perform at least one of the following;
 not provide signalling to present any further instances of the at least first content and second content that has not already been presented by the presentation apparatus; or
 provide signalling to the at least one presentation apparatus for removing any of the at least first content or second content from presentation.

In one or more examples, said signalling for the presentation of the second content further comprises signalling for removing presentation of the first content.

In one or more examples, the space comprises a virtual reality space for presentation to the presenter user and the one or more consumer users in virtual reality, wherein the virtual reality space, when the signalling for the presentation of the first content is provided, has a first volume limit, the first volume limit comprising the spatial extent of the virtual reality space for the consumer users and which includes the first presentation location and not the second presentation location, wherein, if it is determined that the current location is within the second spatial region, the means are configured to provide signalling for increasing the spatial extent of the virtual reality space for the consumer users from the first volume limit to a larger second volume limit that includes the first presentation location and the second presentation location.

Thus, the apparatus, in one or more examples, is configured to provide signalling to the presentation apparatuses to present the virtual space with a limited spatial extent based on the current location of the presenter user, which is indicative of their chosen control of the presentation of the presentation data. This advantageously controls the extent of the virtual space and therefore the extent of the virtual location the consumer users can obtain when exploring the virtual space using their presentation apparatus.

In one or more examples, the virtual reality space for the presenter user is not subject to the spatial extent limit provided by the first volume limit.

In one or more examples, the means are configured to:
provide signalling to the presentation apparatus of one of the consumer users to re-present the first content based on consumer user location information indicative that said one of the consumer users is within the first spatial region while the current location specified by the presenter location information is indicative of the presenter user being within one of the spatial regions of the presentation data other than the first spatial region and having previously been in the first spatial region.

In one or more examples, the first content comprises content that progresses over time and the re-presenting of the first content comprises the presenting of the first content from a beginning time point of the first content.

In one or more examples, the means are further configured to provide for presentation of the virtual reality space for the presenter user.

In one or more examples, the current location of the presenter user comprises a virtual location controlled by the presenter user using a user input device or the current location of the presenter user comprise a physical real-world location of a presenter user, obtained using one or more location sensors, and wherein the physical real-world location is translated to a virtual location in the virtual reality space by the apparatus.

In one or more examples, said signalling for the presentation of the first content is configured to position a virtual location of the at least one consumer user within a threshold distance of the first presentation location; and
said signalling for the presentation of the second content is configured to position the virtual location of the at least one consumer user within a threshold distance of the second presentation location.

In one or more examples, the means are configured to:
receive audio data from a microphone, the microphone for use by the presenter user;
determine, from the presenter location information, one of the first and second spatial regions with which to associate the audio data;
receive consumer user location information indicative of the location of each of the consumer users in the space; and one or both of:

(i) provide for live presentation of the audio data using the presentation apparatus of the at least one consumer user determined, using the consumer user location information, to be in the spatial region associated with the audio data at the time the audio data is received; or
(ii) provide for recording of the audio data and subsequently provide for presentation of the recorded audio data using the presentation apparatus of the at least one consumer user based on the consumer user location information being indicative that the at least one consumer user has entered the spatial region associated with the audio data.

In one or more examples, the means are configured to, after the presenter location information being indicative that the current location of the presenter user has left one of the first spatial region the second spatial region, provide signalling to cause the continued presentation of the first content and the second content respectively in the space for enabling the consumer user to revisit the first or second content.

In one or more examples, the provision of the signalling to the presentation apparatus to provide for the presentation of the second content is conditional on the presenter location information being indicative that the presentation user moved from the first spatial region to the second spatial region.

In one or more examples, the apparatus comprises an apparatus configured to provide conferencing between a virtual reality apparatus for use by the presenter user and the at least one presentation apparatus for use by the consumer users, said conferencing comprising the shared presentation of the presentation data in virtual reality.

In one or more examples, the presentation data includes the first content and second content and metadata that defines the first and second spatial region and the first and second presentation location.

In one and more examples, the apparatus comprises means configured to provide for generation of the presentation data based on user input.

In one or more examples, the space comprises a real-world space around each of the presenter user and the at least one consumer user in which to present the first content and the second content in augmented reality for the presenter user and one or more consumer users. In one or more examples, the respective spatial regions comprise discrete regions of the real-world space around each respective user. In one or more examples, the presenter location information is received from one or more location sensors configured to determine the current location of the presenter user in a real-world space around them. In one or more examples, the one or more location sensors may comprise part of the apparatus.

In a second example aspect there is provided a method, the method comprising:
receiving presentation data comprising at least first content and second content for consecutive presentation, the first content and the second content associated with a respective first and second spatial region that comprises a different part of a space and a respective first and second presentation location that comprise a different location in the space;
receiving presenter location information indicative of a current location of a presenter user in the space;
determining, from the presenter location information, if the current location of the presenter user is within at least one of the first or second spatial region;
if it is determined that the current location is within the first spatial region, providing signalling to at least one presentation apparatus for the presentation of the first content at the first presentation location by the at least one presentation apparatus, the presentation apparatus configured to present the first content to a consumer user, different to the presenter user, in one of virtual reality or augmented reality;

if it is determined that the current location is within the second spatial region, providing signalling to the at least one presentation apparatus for the presentation of the second content at the second presentation location by the at least one presentation apparatus, the presentation apparatus configured to present the second content to the consumer user, different to the presenter user, in the one of virtual reality or augmented reality; and wherein the presentation of the first content is independent of the location of the consumer users and the presentation of the second content is independent of the location of the consumer users.

In a third example aspect there is provided a computer readable medium comprising computer program code stored thereon, the computer readable medium and computer program code being configured to, when run on at least one processor, perform the method of:

receiving presentation data comprising at least first content and second content for consecutive presentation, the first content and the second content associated with a respective first and second spatial region that comprises a different part of a space and a respective first and second presentation location that comprise a different location in the space;

receiving presenter location information indicative of a current location of a presenter user in the space;

determining, from the presenter location information, if the current location of the presenter user is within at least one of the first or second spatial region;

if it is determined that the current location is within the first spatial region, providing signalling to at least one presentation apparatus for the presentation of the first content at the first presentation location by the at least one presentation apparatus, the presentation apparatus configured to present the first content to a consumer user, different to the presenter user, in one of virtual reality or augmented reality;

if it is determined that the current location is within the second spatial region, providing signalling to the at least one presentation apparatus for the presentation of the second content at the second presentation location by the at least one presentation apparatus, the presentation apparatus configured to present the second content to the consumer user, different to the presenter user, in the one of virtual reality or augmented reality; and wherein the presentation of the first content is independent of the location of the consumer users and the presentation of the second content is independent of the location of the consumer users.

In a fourth example aspect there is provided an apparatus comprising:

at least one processor; and at least one memory including computer program code, the at least one memory and the computer program code configured to, with the at least one processor, cause the apparatus to perform at least the following:

receive presentation data comprising at least first content and second content for consecutive presentation, the first content and the second content associated with a respective first and second spatial region that comprises a different part of a space and a respective first and second presentation location that comprise a different location in the space;

receive presenter location information indicative of a current location of a presenter user in the space;

determine, from the presenter location information, if the current location of the presenter user is within at least one of the first or second spatial region;

if it is determined that the current location is within the first spatial region, the means are configured to provide signalling to at least one presentation apparatus for the presentation of the first content at the first presentation location by the at least one presentation apparatus, the presentation apparatus configured to present the first content to a consumer user, different to the presenter user, in one of virtual reality or augmented reality;

if it is determined that the current location is within the second spatial region, the means are configured to provide signalling to the at least one presentation apparatus for the presentation of the second content at the second presentation location by the at least one presentation apparatus, the presentation apparatus configured to present the second content to the consumer user, different to the presenter user, in the one of virtual reality or augmented reality; and wherein the presentation of the first content is independent of the location of the consumer users and the presentation of the second content is independent of the location of the consumer users.

The optional features of the first aspect apply equally to the apparatus of the fourth aspect. Further, the functionality provided by the optional features of the first aspect may be performed by the method of the second aspect and the code of the computer readable medium of the third aspect.

The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
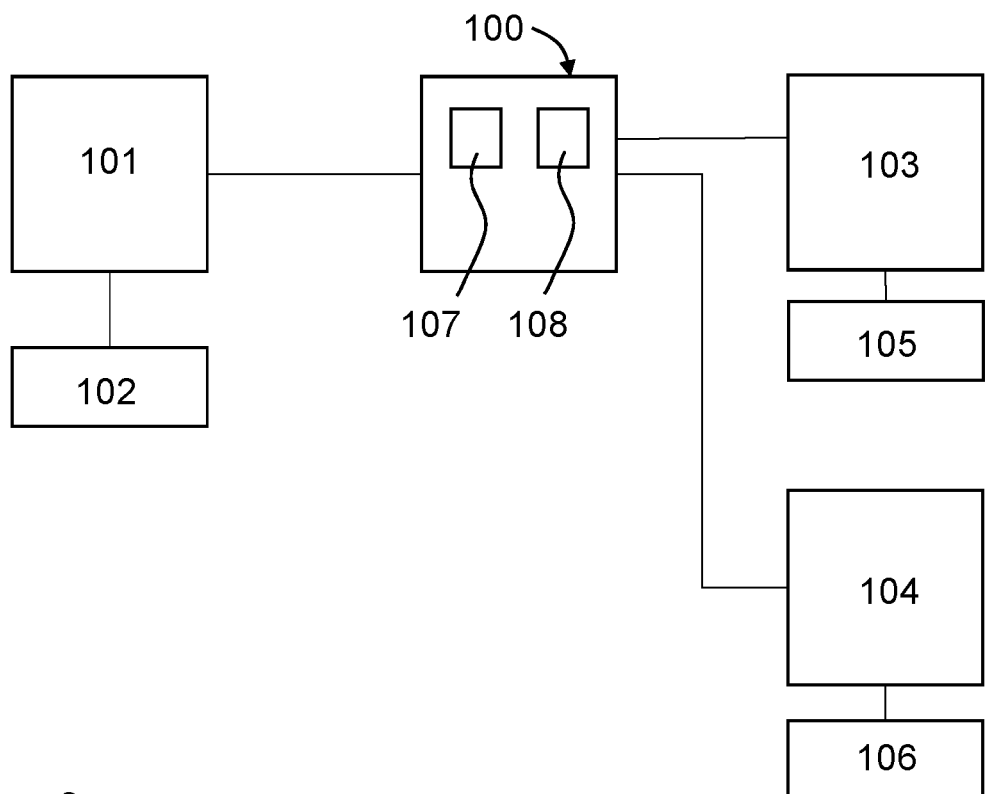
FIG. 1 illustrates an example apparatus for providing for presentation of presentation data in virtual reality or augmented reality or any variation thereof.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of VR content representative of a virtual reality space to a user to simulate the user being present within the virtual reality space. Accordingly, in one or more examples, the virtual reality apparatus may provide signalling to a VR display for display of the VR content to a user while in one or more other examples, the virtual reality apparatus may be part of the VR display, e.g. part of the headset. The virtual reality space may be generated from the VR content. The virtual reality space may comprise a virtual three-dimensional space. The VR content may therefore logically define the virtual reality space and the arrangement of imagery, objects, audio and any other content in the virtual reality space.

Accordingly, the user feels immersed in the space, as if they were there, and may look around the VR space at the elements of the VR content displayed/presented around them. Virtual reality may be used to replicate a real-world scene to simulate the user being physically present at a real-world location or may be used to present a VR space of computer-created content or a combination of computer-created and real-world content. The virtual reality apparatus may therefore generate the virtual, three-dimensional, space in which to present the imagery, audio and/or other content of the VR content. One or more examples herein may relate to the provision of virtual reality.

The spatial extent of the VR space is typically larger than a portion a user can view with the VR display at any one time. Thus, the virtual reality apparatus may provide, for display on the VR display, a virtual reality view of the VR space to a user, the VR view showing only a spatial portion of the VR space that is viewable at any one time. The virtual reality apparatus may provide for panning around (e.g. direction of view) of the VR view in the VR space based on movement of a user's head or other user input. The virtual reality apparatus may provide for translation movement of a point of view location in the virtual reality space and provide a corresponding VR view in the VR scene based on sensed movement of the user head or other user input.

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real-world environment around them, which is augmented or supplemented with content provided by the augmented reality apparatus, which may be overlaid on their view of the real world and/or aurally overlaid over an aural real-world scene they can hear. The content may comprise multimedia content such as pictures, photographs, video, diagrams, textual information, aural content among others. Thus, while augmented reality may provide for direct viewing of the real world with the addition of computer-generated graphics and/or audio content, a user of virtual reality may only be able to see content presented on the VR display of the virtual reality apparatus substantially without direct viewing of the real world. One or more examples herein may relate to the provision of augmented reality.

The VR content in combination with the virtual reality apparatus may be configured to enable a user to be free to explore the virtual reality space. Thus, the virtual reality apparatus may allow for the user to be provided with a free point-of-view location in the virtual reality space along with a free direction-of-view. Such VR is also known as six degrees of freedom (6DoF) VR or volumetric VR to those skilled in the art. Thus, in 6DoF VR the user may be free to look in different directions around the VR space by modification of their direction-of-view and also free to change their point-of-view location in the VR space by translation along any one or more orthogonal x, y and z axes. The modification of the direction-of-view may be provided by a sensed physical movement of the head of a user. The modification of the point-of-view location may be provided by a sensed physical movement of the user. The movement available in a 6DoF virtual reality space may be divided into two categories: rotational and translational movement (with three degrees of freedom each). Rotational movement enables a user to turn their head to change their viewing direction. The three rotational movements are around x-axis (roll), around y-axis (pitch), and around z-axis (yaw). Translational movement means that the user may also change their point of view in the space to view the VR space from a different virtual location, i.e., move along the x, y, and z axes according to their wishes. The translational movements may be referred to as surge (x), sway (y), and heave (z) using the terms derived from ship motions.

In another example, virtual reality may comprise predefined-viewing-location VR or three degrees of freedom (3DoF) in which the point-of-view location of the user in the virtual reality space may be fixed or follow a predefined path. Accordingly, a user may be free to change their direction-of-view with respect to the virtual reality imagery provided for display around them in the virtual reality space, but they may not be free to arbitrarily change their point-of-view location in the VR space to explore the VR space. Predefined-viewing-location VR content may provide the user with three degrees of freedom in the VR space comprising rotation of the viewing direction around any one of x, y and z axes and may therefore be known as three degrees of freedom VR (3DoF VR). In other examples, the VR content in combination with the virtual reality apparatus may be configured to enable 3DoF VR but with a limited amount of translation movement in the virtual reality space. For example, the virtual reality view may be renderable from a default point-of-view location and from point-of-view locations within a threshold distance thereof. This type of virtual reality may be known as 3DoF+.

One or more examples, herein relate to the provision of virtual reality of one or more types including 6DoF, 3DoF and 3DoF+.

Mixed reality is similar to augmented and virtual reality and includes the use of a three-dimensional model of the real-world environment to enable virtual objects, including visual and audio objects, to appear to interact with real-world objects in terms of one or more of their movement, presentation (e.g. audible presentation) and appearance. For example, a virtual ball may appear to roll along a real-world surface because the geometry of the real-world surface may be captured or otherwise modelled in mixed reality. In other examples, the acoustics of a real-world room may be modelled, and audio may be presented with effects to mimic the acoustics of the real-world room the user is in. In this disclosure mixed reality is considered as a subset of virtual reality and a subset of augmented reality. Accordingly, the examples described herein that specify their application to virtual reality or augmented reality also relate to the provision of mixed reality content.

Spatial audio comprises audio presented in such a way to a user that each audio source can be perceived to originate from a particular location, as if the individual sources of the audio were located at those particular locations. Spatial audio content comprises audio for presentation as spatial audio and, as such, typically comprises audio having directional information (either explicitly specified as, for example, metadata or inherently present in the way the audio is captured), such that the spatial audio content can be presented such that its component audio is perceived to originate from one or more points or one or more directions in accordance with the directional information. The audio rendering may take into account early reflections and reverberation modelled, e.g., according to the virtual or real space in which the audio presentation takes place.

Thus, virtual reality content may be provided with spatial audio having directional properties, such that the audio is perceived to originate from a point in the VR space, which may be linked to the imagery of the VR content. Augmented or mixed reality content may be provided with spatial audio, such that the spatial audio is perceived as originating from real world objects visible to the user and/or from augmented reality graphics overlaid over the user's view.

Spatial audio may be presented independently of visual virtual reality or visual augmented reality content. Spatial audio, in some examples, may be considered to be augmented reality content because it augments the aural scene perceived by a user. As an example of independent presentation of spatial audio, a user may wear headphones and, as they explore the real world, they may be presented with spatial audio such that the audio appears to originate at particular locations associated with real world objects or locations. For example, a city tour could be provided by a device that tracks the location of the user in the city and presents audio describing points of interest as spatial audio such that the audio is perceived to originate from the point of interest around the user's location. One or more of the embodiments described herein may present spatial audio.

The spatial positioning of the spatial audio may be provided by 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. Spatial audio may use one or more of volume differences, timing differences and pitch differences between audible presentation to each of a user's ears to create the perception that the origin of the audio is at a particular location or in a particular direction in space. The perceived distance to the perceived origin of the audio may be rendered by controlling the amount of reverberation and gain to indicate closeness or distance from the perceived source of the spatial audio. It will be appreciated that spatial audio presentation as described herein may relate to the presentation of audio with only a perceived direction towards its origin as well as the presentation of audio such that the origin of the audio has a perceived location, e.g., including a perception of distance from the user.

It may be desirable to provide a presentation in virtual reality, augmented reality or mixed reality. Hereinafter, for brevity, the presentation will be described as being presented in virtual reality rather than listing VR, AR and MR separately. Thus, unless the context dictates otherwise, it can be assumed that reference to virtual reality may relate to any of virtual reality, augmented reality or mixed reality. The presentation may be logically represented as presentation data.

The presentation data may comprise a plurality of "slides" for display consecutively, similar to as displayed by conventional slideshow presentation software. The presentation of conventional slides in virtual reality, however, may limit the benefit of the virtual reality experience because the viewer or consumer will be limited to a location or a virtual location in the virtual reality space at which the presentation is provided. Further, the use of virtual reality enables the presentation of more than just two-dimensional slides of text and images. Virtual or augmented reality may enable the content of the presentation to comprise any of slides (such as text), imagery (such as photographs or other visual content), video, audio (such as monophonic, stereophonic or spatial audio) and static or animated volumetric models, such as three-dimensional virtual objects. Further, the content may comprise another virtual reality space within the virtual reality space that is used to present the content of the presentation data. Thus, the another virtual reality space may be presented based on the consumer virtually "stepping into" a region in the virtual reality space of the presentation. Thus, the use of virtual reality to provide presentations may be advantageous given the opportunity to present a greater variety of content than conventional two-dimensional slides. Accordingly, the "slides" of presentation configured to be presented in virtual reality may comprise a plurality of instances of content for presenting consecutively, such as first content, second content, third content and so on.

The provision of the presentation may be controlled by first user input received from a first user or a "presenter user". The presentation may be provided for consumption by one or more other users, termed "consumer users", in virtual reality.

To summarise, in one or more examples, the use of virtual or augmented reality (or said variations thereof) to provide for presentation of presentation data comprising content for consecutive presentation may allow for the use of a greater variety and richness of content but the presentation in said realities may hinder the ability of the consumers to interact with the content as well as the wider virtual space. Thus, in augmented reality the presentation data may be presented to appear at a fixed real-world location and in virtual reality the presentation data could be configured to appear at a fixed virtual location. For example, the virtual reality space may comprise a virtual museum and the presentation may be about the collection of the exhibits. The need for the consumer to remain at a virtual location to watch the presentation is restrictive on their exploration of the exhibits of the collection. Thus, the presentation of content in virtual reality can hinder the consumer's interaction with the content or other content in the virtual or augmented reality space.

FIG. 1 shows an example apparatus 100 for providing for presentation of presentation data. The presentation data may be received from presentation data generation apparatus (not shown) used by a content creator, which may comprise the presenter user. The apparatus 100 is configured to receive presenter location information, such as from a presentation apparatus, which may comprise virtual reality apparatus 101. The virtual reality apparatus 101 may be for use by a presenter user who wishes to present the presentation data to consumer users. The virtual reality apparatus 101 may, in one or more examples, include one or more location sensors for determining the location of the presenter user in a real-world space, which may be translated by the virtual reality apparatus 101 into a location in a virtual reality space. The one or more sensors may be part of a headset 102 with which the virtual reality apparatus 101 may display the content of the presentation data to the presenter user. In other examples, the audio/visual presentation functionality of the headset 102 may be separate from the one or more sensors. Thus, the presenter location information may be provided by the one or more sensors and/or virtual reality apparatus 101. It will be appreciated that in other examples, the presenter user may control their location in a virtual space by means other than sensed real-world movement, such as by use of a user-input device. Accordingly, the presenter location information may be provided by the virtual reality apparatus 101 or other device the presenter user may use to explore a virtual reality space in which the presentation content is configured for display.

The apparatus 100 may be configured to present the content of the presentation data to consumer users using at least one presentation apparatus. In this example two presentation apparatuses 103, 104 are shown, although it will be appreciated there may be any number of presentation apparatuses enabling any number of consumer users to consume the presentation data. Each of the presentation apparatuses 103, 104 includes a headset 105, 106, which may comprise a virtual reality headset if the presentation data is for presentation in virtual reality or augmented reality glasses or the like if the presentation data is for presentation in augmented reality or mixed reality. The headsets 105, 106 may include location sensors or other input device to either detect the location of the consumer users or enable the consumer users to change their position. Accordingly, in virtual reality or in augmented reality, location sensors can be used in translating real-world user movement into a location in a virtual space or in the presentation of augmented reality graphics so that they appear at a given real-world location. In other examples, user input may be used to control a user's location in virtual reality.

In one or more examples, the presentation apparatuses 103, 104 may provide for presentation for more than one consumer user. Accordingly, more than one headset may be connected to a single presentation apparatus 103, 104 for use by a corresponding number of consumer users. Even though a single presentation apparatus may serve multiple users, it may still be considered to be performing the functionality of a plurality of presentation devices. Thus, references to a plurality of presentation devices may equally refer to a single presentation apparatus serving two or more users.

The headsets 102, 105, 106 may include sensors to monitor head and/or eye position so that a corresponding direction-of-view can be provided in virtual reality or to position augmented reality content in the real-world space around the user (e.g. world locked augmented reality).

While headsets 105, 106 are disclosed for consumption of the content of the presentation data, it will be appreciated that the disclosure is not limited to head mounted displays for use by the consumer users. In one or more other examples, a smartphone may be used to consume the content in augmented reality.

The apparatus 100 may be considered as an intermediary apparatus to enable virtual conferencing between the presenter user, who may use the virtual reality apparatus 101, and one or more consumer users, who may use the presentation apparatuses 103, 104. In one or more examples, the apparatus 100 may comprise a server connectable to the presentation apparatuses 101, 103, 104 via one or more networks, such as the Internet. In other examples, the functionality of the apparatus 100 may be distributed or located elsewhere, such as in one of or distributed over the virtual reality apparatus 101 and any one or more of the presentation apparatuses 103, 104 and a server. Conferencing may provide for shared presentation of presentation data and, optionally, at least one of voice or text communication between users.

It will also be appreciated that while different terminology is used to distinguish between the virtual reality apparatus 101 and the presentation apparatuses 103, 104, they may be capable of the same functionality. Thus, in one or more examples, the user of a presentation apparatus 103 may be designated the presenter and therefore their presentation apparatus 103 may be given the control described herein for the virtual reality apparatus 101. Accordingly, in this respect, the terminology "virtual reality apparatus" and "presentation apparatuses" is used for understanding rather than implying dedicated functions performed by those apparatuses.

However the apparatus 100 may be embodied, such as in the form of a server or part of one or more of the apparatuses 101, 103, 104, the virtual reality apparatus 101 may comprise or be connected to a processor 107 and a memory 108 and may be configured to execute computer program code. The apparatus 100 may have only one processor 107 and one memory 108 but it will be appreciated that other embodiments may utilise more than one processor and/or more than one memory (e.g. same or different processor/memory types). Further, the apparatus 100 may be an Application Specific Integrated Circuit (ASIC).

The processor may be a general purpose processor dedicated to executing/processing information received from other components, such as from the virtual reality or presentation apparatuses 101, 103, 104 (and/or the sensors thereof), in accordance with instructions stored in the form of computer program code in the memory. The output signalling generated by such operations of the processor is provided onwards to further components, such as the presentation apparatuses 101, 103, 104.

The memory 108 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

The apparatus 100, in this example, comprises a virtual reality apparatus 101 for presenting a virtual reality space with the content of the presentation data arranged therein. However, such presentation may be performed in augmented reality. The presentation apparatuses 103, 104, in this example, comprises virtual reality apparatuses for presenting a virtual reality space with the content of the presentation data arranged therein for the consumer users. However, again such presentation may be performed in augmented reality. It will be appreciated that reference to a virtual reality space may refer to the space around the user when considering implementations in augmented reality, such that the augmented reality content appears to have a location in the space around each respective user.

The apparatus 100 or the presentation apparatuses 103, 104 under the control of signalling from the apparatus 100 may provide for display of the presentation data in virtual/augmented reality for the consumer user(s). The apparatus 100 or the virtual reality apparatus 101 under the control of signalling from the apparatus 100 may provide for display of the presentation data in virtual/augmented reality for the presenter user.

Figure 2:
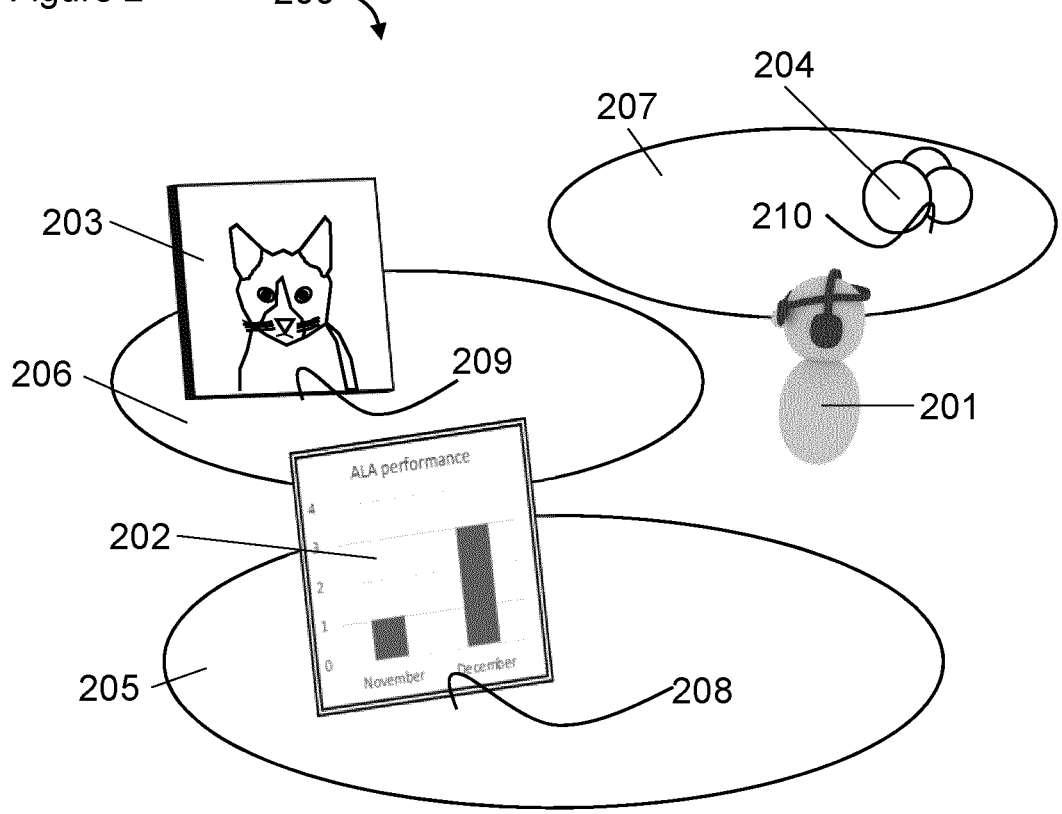
FIG. 2 shows a space, such as a virtual reality space, in which first, second and third content of presentation data is visible as well as spatial regions associated with each of the first, second and third content.

Example FIG. 2 shows a space 200 comprising a virtual reality space, which may be considered as a virtual three-dimensional volume in which the presentation data can be created or viewed, such as by a presenter user 201. The presenter user 201 is shown as an avatar to illustrate the location (and rotation) of the presenter user 201 in the space 200. The avatar of the presenter user 201 may be visible to the consumer users or may not be visible. While in this example the space 200 is a virtual reality space in other examples it may comprise a real-world space in which augmented reality objects, representing the content of the presentation, can be positioned as if they are present in the space. The apparatus 100 may provide signalling to cause the virtual reality apparatus 101 to present the space 200 for the presenter user 201.

The presentation data in this and other examples may comprise first content 202, second content 203 and third content 204 for consecutive presentation. The first to third content represents a logically ordered set of individual instances of content, which the presenter user 201 may wish to present in a manner akin to a slideshow presentation. In this example, the first content 202 comprises a bar graph representing some statistics, the second content 203 comprises an image of a cat and the third content 204 comprises a three-dimensional model 204 represented by three spheres. The content 202, 203, 204 may be presented three-dimensionally such that a consumer user may move around the model, image or "slide", which may appear to float in the space 200. Accordingly, the three-dimensional content, such as the third content 204, as well as conventionally two-dimensional content, such as the first and second content 202, 203, may be configured for display in a three-dimensional form such that the consumer user(s) may experience the content from different directions of view, such as oblique angles, front-on as well as from the back. The presentation of content in this way may make for a more natural and engaging way of consuming content and uses the advantages of presentation in a space 200 using virtual or augmented reality.

Each of the first content 202, the second content 203 and the third content 204 are associated with a respective first spatial region 205, a second spatial region 206 and a third spatial region 207 that each comprises a different discrete part of the space 200. The spatial regions 205-207 are shown as areas although they may in other examples comprise discrete volumes of the space 200. The spatial regions 205-207 may be arranged next to each other. The spatial regions 205-207 may be non-overlapping or partially overlapping in terms of the area or volume of the space 200 they occupy. The spatial regions 205-207 may be used to trigger the presentation of the associated content when the presenter user 201 enters them, which will be described in more detail below.

Each of the first content 202, the second content 203 and the third content 204 may be logically associated with a respective first 208, second 209 and third presentation location 210 that each comprise a different location in the space 200. The presentation locations 208, 209, 210 may comprise locations logically defined in the space 200 at which the first content 202, the second content 203 and the third content 204 is to be presented. Thus, for visual content it may comprise the location at which the content would be visible to a consumer user should they look towards that location, subject to there not being intervening virtual or real-world objects that would block the view of the presentation location 208, 209, 210. For audio content, the presentation location 208, 209, 210 may comprise the location used for spatial audio presentation and may therefore comprise the location from which the consumer user(s) would perceive the audio to originate in the space 200. In other examples, audio may be presented stereophonically or monophonically. The audio content may comprise volumetric audio content. The audio content may comprise an arrangement of audio sources around the presentation location 208, 209, 210 wherein the audio sources may be presented as spatial audio or ambient audio. For example, the audio content may comprise a 7.1+4 channel-based audio bed surrounding or centred on the presentation content 202, 203, 204, the presentation location 208, 209, 210 or within the spatial region 205, 206, 207. The audio content may only be audio for consumer users within a predetermined distance of the presentation location 208-210 or within the associated spatial region 205-207.

In one or more examples, the presentation data includes metadata that defines the spatial region and the presentation locations.

In this and one or more other examples, the presentation locations 208, 209, 210 are within the respective first, second and third spatial regions 205-207. However, this need not be the case and in other examples and the location of a spatial region may be independent of the location of a related presentation location. In one or more examples, the locating of a presentation location outside of its related spatial region may be advantageous as the presenter user 201 can be present in the virtual space, such as represented as an avatar, but may not block the view or consumption of the associated content, as will be understood more fully in the description that follows.

The presentation of the first content 202, the second content 203 and the third content 204 may be provided to one or more consumer users at different times based on the location of the presenter user 201 in the space 200 relative to the respective first, second and third spatial regions 205-207.

Accordingly, the apparatus 100 may be configured to receive presenter location information indicative of the current location of the presenter user 201 in the space 200. As described above, the location information may be received from the virtual reality apparatus 101 used by the presenter user 201 or the sensors associated therewith.

Figure 3:
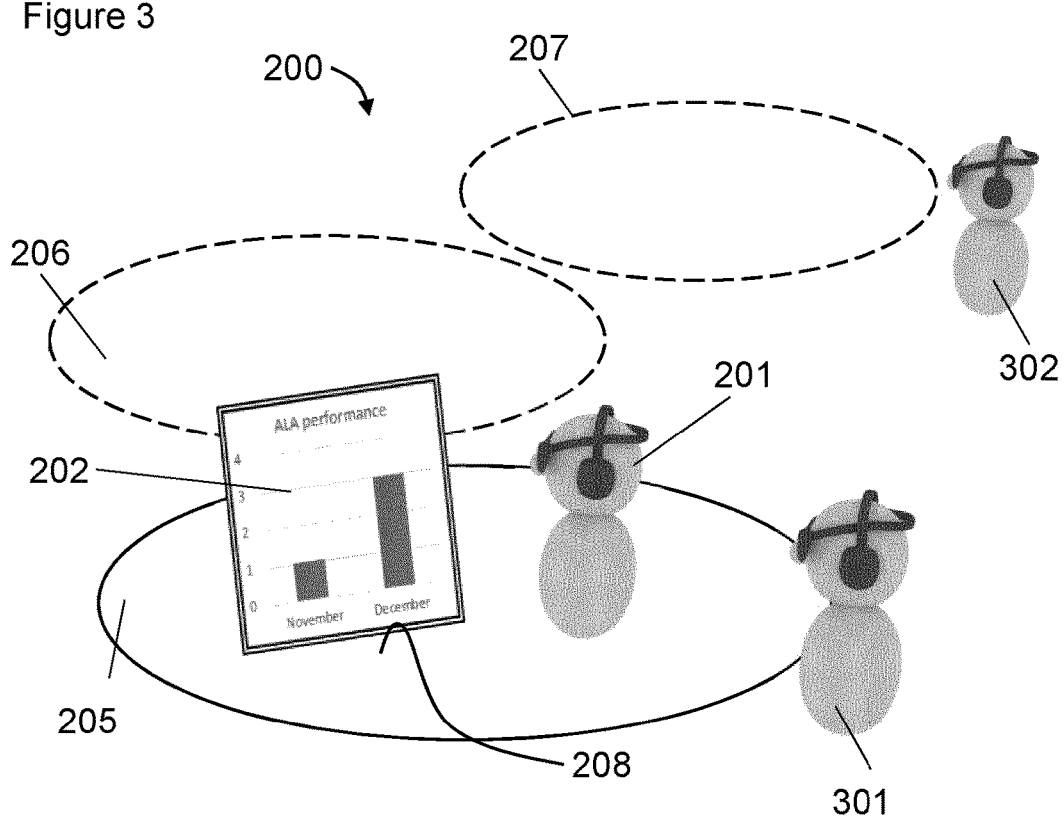
FIG. 3 shows the space of FIG. 2 presented in a presentation mode, with a presenter user in the first spatial region and a plurality of consumer users.

Example FIG. 3 shows the same space 200 and the location of the spatial regions 205-207. Example FIG. 3 also shows two consumer users 301, 302 at different locations in the space 200. The first consumer user 301 may use the first presentation apparatus 103 and the second consumer user 302 may use the second presentation apparatus 104 to experience the space 200 and the presentation data for presentation therein.

While example FIG. 2 shows the layout of all of the presentation data in the space 200, example FIG. 3 may be considered to show a presentation mode in which the presentation of the presentation data is controlled by input, that is based on the presenter location information, from the presenter user 201.

The apparatus 100 is configured to determine, from the presenter location information, if the current location of the presenter user is within any of the respective spatial regions 205-207. If the presenter location information indicates that the presenter user 201 does not have a location in any of the respective spatial regions 205-207 then the apparatus 100 is configured to provide signalling or not provide signalling such that the first, second and third content 202-204 of the presentation data does not transition from being not presented to being presented for the period the presenter user 201 does not have a location in any of the respective spatial regions 205-207. Thus, outside the spatial regions no triggering of the presentation of the content is provided.

In the example of FIG. 3, the presenter user 201 is shown within the first spatial region 205. Accordingly, the presenter location information will be indicative of the presenter user 201 having such a location in the space 200.

The apparatus 100 may, in direct response to the current location of the presenter user 201 being within or having entered the first spatial region, provide signalling to the presentation apparatuses 103, 104 for the presentation of the first content 202 at the first presentation location 208 by the presentation apparatuses 103, 104 for consumption by the consumer users 301, 302. The consumer users 301, 302 may therefore experience the presentation of the first content in either virtual reality or augmented reality or any variation thereof.

The presentation of the content of the presentation data is independent of the location of the consumer users 301, 302 in the space 200. Thus, the second consumer user 302 will not be presented with the third content 204 as they approach the third spatial region 207 until the presenter user 201 has entered the third spatial region 207, as indicated by the presenter location information.

The signalling provided by the apparatus 100 may be considered to activate the relevant first, second or third content 202, 203, 204 in the space 200 and may be presented to the one or more consumer users 301, 302 based on them looking towards the presentation location 208-210 associated therewith. In one or more examples, the apparatus 100 may be configured to receive at least direction-of-view information indicative of the direction of view of the consumer users 301, 302. If the direction-of-view information is indicative of the associated consumer user looking toward the first presentation location 208 then the apparatus 100 may provide for display of the first content 202 for that consumer user using the presentation apparatus 103, 104. In other examples, the apparatus 100 may signal that the first content is available for presenting and the presentation apparatuses 103, 104 may be configured to determine when to display the content based on the direction-of-view information. In one or more examples, once the apparatus 100 has signalled that the first content is available for presenting, the presentation apparatuses 103, 104 may be configured to determine when to display the first content based on the distance of the consumer user from the presentation location 208 relative to a threshold distance. In other examples, in order to provide timely presentation, the first content 208 may be presented within a predetermined time after being signalled as available whether the consumer user has or has not arrived within the threshold distance of the presentation location 208. For first, second and third content that comprises audio content, the one or more consumer users 301, 302 may or may not need to be looking towards the first presentation location 208 to be presented with the audio content.

Figure 4:
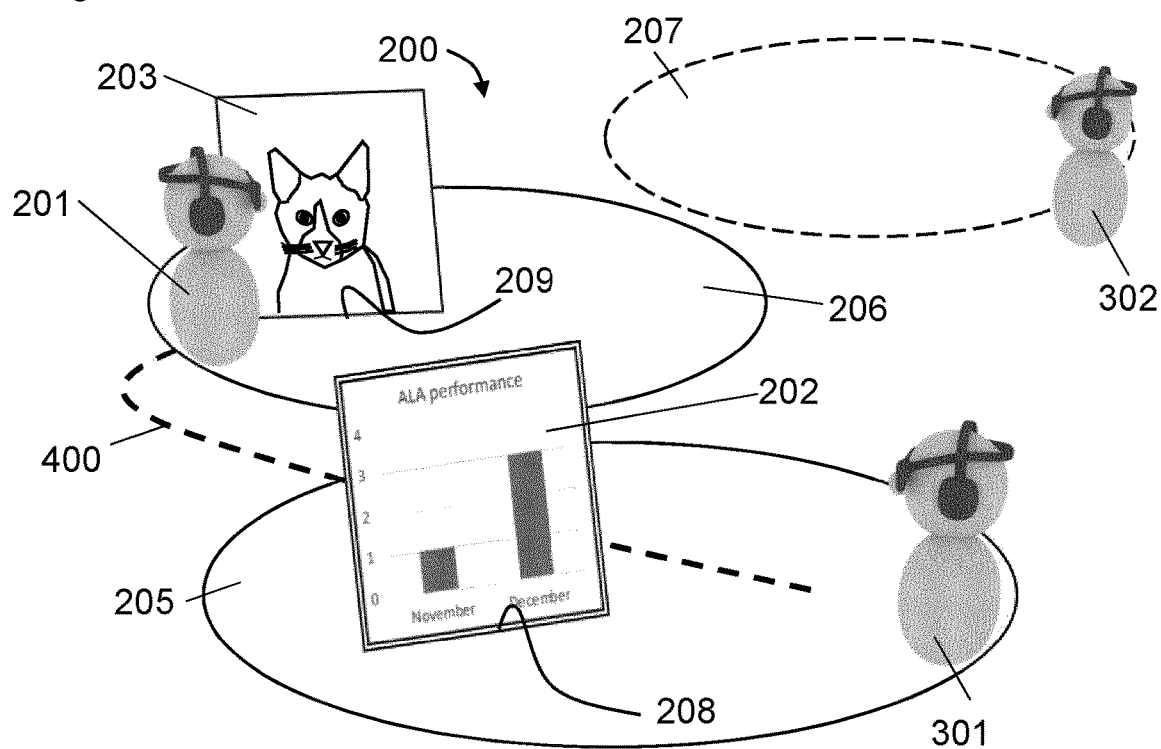
FIG. 4 shows the presenter user having moved from the first spatial region to the second spatial region.

Example FIG. 4 shows the presenter user 201 having moved 400 in the space 200 from the first spatial region 205 to the second spatial region 206. Accordingly, the apparatus 100 will receive presenter location information indicative of the presenter user 201 having a current location that is within the second spatial region 206.

The apparatus 100 may, in direct response to the current location of the presenter user 201 being within or having entered the second spatial region, provide signalling to the first and second presentation apparatus 103, 104 for the presentation of the second content 203 at the second presentation location 209 by the presentation apparatuses 103, 104 for the consumer users 301, 302. The consumer users 301, 302 may therefore experience the presentation of the second content in either virtual reality or augmented reality or any variation thereof.

The presentation of the second content 203 of the presentation data is independent of the location of the consumer users 301, 302 in the space 200. Thus, again, the second consumer user 302 will not be presented with the third content 204 as they approach the third spatial region 207 until the presenter user 201 has entered the third spatial region 207, as indicated by the presenter location information.

The signalling provided by the apparatus 100 may be considered to activate the second content 203 in the space 200 and may be presented to the one or more consumer users 301, 302 based on them looking towards the presentation location 209. In one or more examples, the apparatus 100 or presentation apparatuses 103, 104 may be configured to receive at least direction-of-view information indicative of the direction of view of the consumer users 301, 302. If the direction-of-view information is indicative of the associated consumer user looking toward the second presentation location 209 then any one or combination of the apparatuses 100, 103, 104 may provide for display of the second content 203 for that consumer user. For first, second and third content that comprises audio content, the one or more consumer users 301, 302 may or may not need to be looking towards the relevant presentation location 208 to be presented with the audio content.

Thus, in one or more examples, the presentation data may be considered as comprising a slideshow presentation of spatially distributed content. Further, the presentation of the content of the presentation data may be considered to be controlled by a location of the presenter user 201 relative to spatial regions 205, 206 associated with the content 202, 203 of the presentation data. This may provide an experience that better uses the spatial freedom of a virtual or augmented space to provide a presentation without hindering the management of the presentation of the presentation data by the presenter user 201. Thus, the presenter user 201 maintains control of the presentation of the content while giving the consumer users freedom to move around the space 200. It will be appreciated that just as a slideshow may comprise any number of slides, the presentation data may comprise a plurality of instances of content of which the first, second and third content comprise three instances of possibly many instances of content. In one or more examples, one of the instances of content may comprise audio and a subsequent instance of content may include information that provides for continuation of the audio from the preceding instance of content. In one or more examples, the content comprises information indicative of the way audio is to be presented. Thus, in one or more examples, one of the instances of content may comprise audio with a first speaker configuration and a subsequent instance of content may comprise information that provides for continuation of the audio from the preceding instance of content but with a different, second speaker configuration. Accordingly, in one or more examples, the second content, for example, may comprise instructions to modify the presentation of the first content, for example, whether that comprise audio or visual content.

The apparatus 100 may be configured to provide the same space 200, that is the same space 200 in this example, to the presenter user 201 and the first and second consumer users 301, 302 such that they experience the same virtual environment. In one or more examples, the users 301, 302, 201 may be represented by markers or avatars and may be visible to one another in the space 200. In one or more examples, the presenter user 201 may be visually hidden from the one or more consumer users 301, 302. This may prevent the presenter user from interfering with or blocking the view of the consumer users 301, 302 which may be important given the freedom of the consumer users to move to different vantage points in the space 200.

The location of the presenter user 201 in the space 200 provide for control of which content to "reveal" based on their location correlating with the spatial regions. However, if it is determined that the current location is not within any of the respective spatial regions 205, 206, 207 the apparatus 100 may be configured to perform different actions. In one or more examples, the apparatus may be configured to not present any further instances of the content of the presentation data. Signalling may be provided to prevent such presentation by the presentation apparatuses 103, 104 or the absence of signalling may cause such an effect. In one or more other examples, the apparatus 100 may provide signalling to the at least one presentation apparatus 103, 104 for removing one or more of the first content and the second content from presentation in the space 200. This may be advantageous because the space 200 may not become cluttered with content 202, 203, 204 making navigation of the space difficult for the consumer users 301, 302.

In the example of FIG. 4, the presenter user 201 moving to the second spatial region 206 from the first spatial region leaves the first content 202 being presented in the space 200. Thus, a consumer user 301, 302 is able to move in the space 200 if they wanted to revisit or refresh their understanding of the first content 202 which is presented prior to the second content 203 that is currently being "activated" or presented by the presenter user 201. However, in one or more other examples, said signalling for the presentation of the second content 203 may further comprise signalling for removing presentation of the first content 202. Thus, only the most recently "triggered" or presented content is presented in the space 200. In one or more examples, a combination of these examples may be provided. Thus, the presentation data may include content persistence information associated with each of the first, second and third content therein to define whether or not the content persists in the space 200 or whether it is removed from presentation when subsequent content is activated by the presenter user 201 moving to a subsequent spatial region. In one or more examples, the apparatus may be configured to generate the content persistence information from presenter (or consumer) user input received during the presentation, which may be combined with or supersede the persistence information of the presentation data (if available). Thus, the apparatus may be configured to provide for some content to continue to be visible after the presenter user has moved on to the next spatial region and other content to be removed from presentation, based on the persistence information. In the event that the presenter user skips one of the instances of content by moving to a spatial region that is not directly consecutive with the preceding spatial, the apparatus may be configured to allow for a consumer user to trigger the presentation of the skipped content by user input, which may comprise the determination that the consumer has moved to the spatial region associated with the skipped content.

Figure 5:
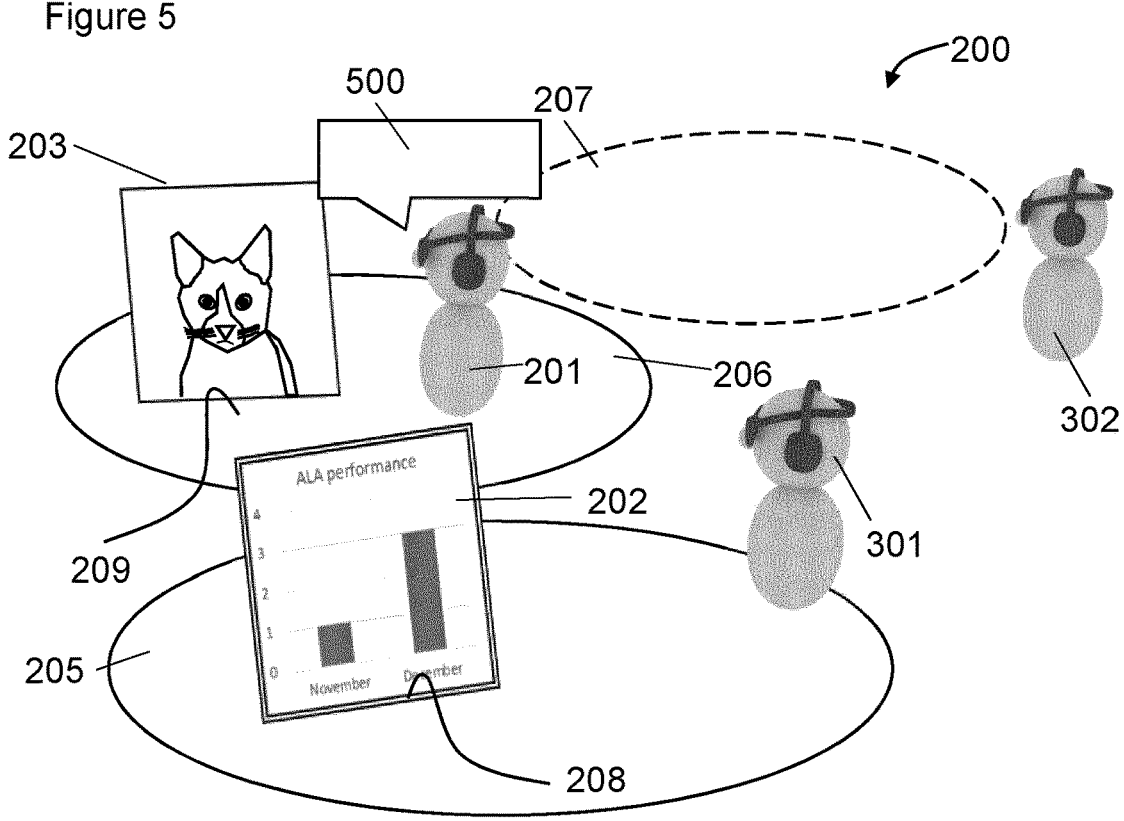
FIG. 5 shows the presenter user in the second spatial region providing audio data.

Example FIG. 5 shows the presenter user 201 within the second spatial region 206 and providing voice commentary about the second content 203, illustrated by speech bubble 500. Thus, for any of the instances of content 202, 203, 204, the presenter user 201, and optionally the consumer users 301, 302, may be able to provide vocal or textual commentary.

Thus, in one or more examples, the apparatus 100 may be configured to receive audio data from a microphone that is for use by the presenter user 201. The microphone may be part of the headset 102. The audio data may be logically encoded voice information of the presenter user's voice. The apparatus 100 may be configured to determine, from the presenter location information, which of the spatial regions the presenter user 201 is currently in so that the audio data may be associated with that spatial region or the related content. It will be appreciated that while the presentation data may include audio as part of the content, the audio data described in this example comprises audio received during the presentation mode rather than during a presentation data creation or editing mode in which the presentation data is created or edited.

Example FIG. 5 shows the apparatus 100 providing for the live presentation of the audio data using the presentation apparatuses 103, 104. Thus, the audio data is provided to the presentation apparatuses 103, 104 for presentation as it is received subject to any network data transmission latency or processing overheads.

In one or more examples, the current location of the consumer users may be determined, using consumer user location information. Similar to the presenter location information, the headset 105, 106 or location sensors may be used to determine the current location of the consumer users to provide the consumer user location information to the apparatus 100. In one or more examples, the live presentation of the audio data may be conditional on the respective consumer user being determined to be currently within the spatial region associated with the audio data at the time the audio data is received. This may be advantageous because in a space 200 that allows free movement of the consumer users 301, 302, their current presence in the relevant spatial region helps to ensure they understand to what the voice data likely relates (i.e. the content in that spatial region). Thus, the apparatus 100 may not provide for live presentation of the audio data to any consumer user who is not within the spatial region associated with the audio data.

The apparatus 100 may be configured to provide for recording of the audio data received from the presenter user 201. It will be appreciated that while audio data received from the presenter user 201 is described, the audio data may equally comprise textual data. Whether the data is audio data or textual data, it may be used to enable the presenter user to describe/present/explain the content, similar to a conventional presentation in which a presenter describes their slides during the presentation. Accordingly, mentions of audio data described below may be considered also to be mentions of textual data, such as by progressive display of the text of the textual data.

Figure 6:
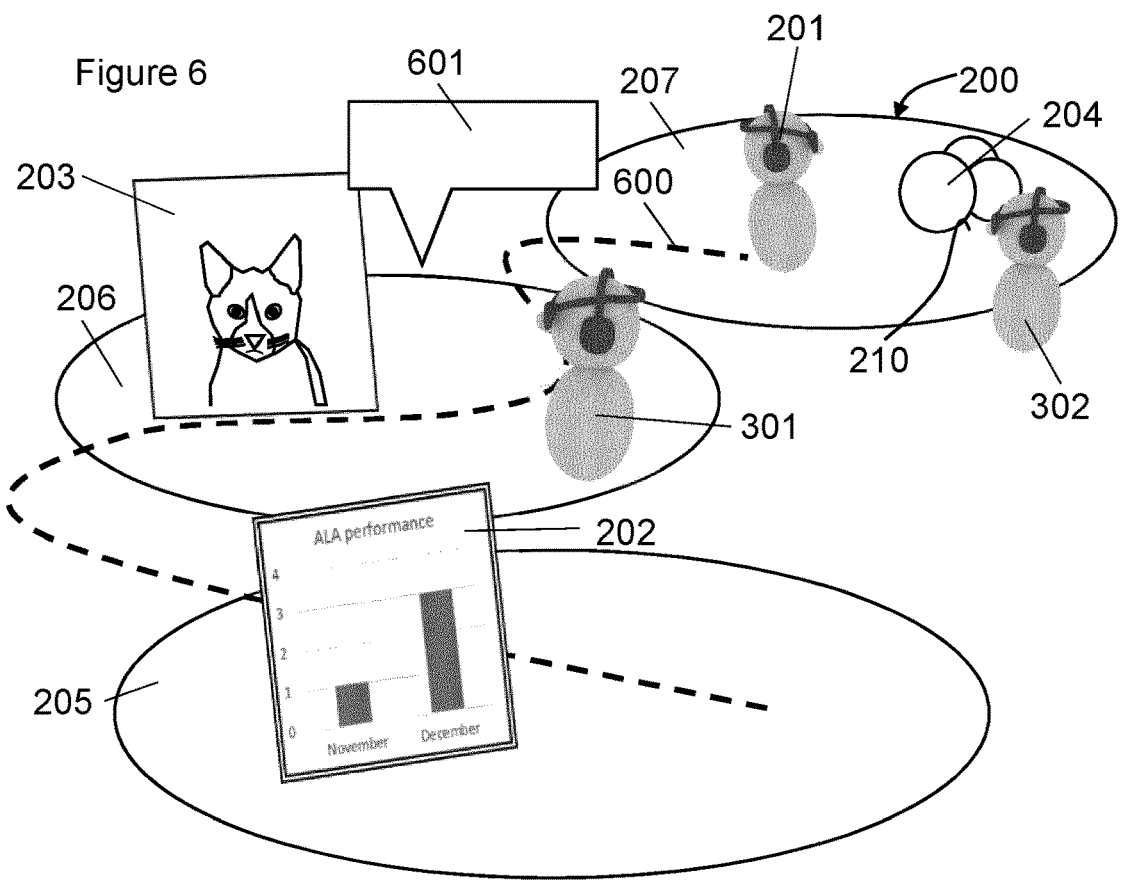
FIG. 6 shows the presenter user having moved from the second spatial region to the third spatial region with a plurality of consumer users.

Example FIG. 6 shows the presenter user 201 having moved 600 to the third spatial region 207 from the second spatial region 206. However, the first consumer user 301, who may have been following the presenter user 201 has returned to the second spatial region 206, perhaps to revisit the second content 203. In other examples, the first consumer user 301 may be following the presenter user 201 but at a slower pace and thus may have reached the second spatial region 206 after the presenter user 201. In either example, the first consumer user 301 has entered the second spatial region 206 at least after the audio data began to be received by the apparatus 100 from the presenter user 201.

In this circumstance, and in one or more examples, the apparatus 100 may be configured to provide for presentation of the recorded audio data 601 using the presentation apparatus 103 of the first consumer user 301 who entered the second spatial region 206 associated with the recorded audio data. Thus, the consumer user location information is received by the apparatus and is indicative that the first consumer user 301 has entered the second spatial region 206, which provides for the presentation of the recorded audio data to the first consumer user 301.

As mentioned above, example FIG. 6 shows the presenter user 201 having moved 600 to the third spatial region 207. Accordingly, the inclusion of the third content 204 in the space 200 is provided for presentation to the consumer user's 301, 302 using the presentation apparatuses 103, 104 when they have a direction-of-view in the direction of the third presentation location 210.

It will be appreciated that the spatial layout of the first, second and third content 202, 203, 204 provides a convenient and intuitive experience that allows the consumer user's 301, 302 to revisit content that was provided for presentation prior to the content that may be provided for presentation more recently by the presenter user 201. Accordingly, with reference to example FIG. 6, the presenter user 201 most recently triggered the presentation of the third content 204 by entering the third spatial region 207. The first consumer user 301 however, may have returned to the second spatial region or any prior spatial region that the presenter user 201 has visited during presentation of the presentation data.

The apparatus 100 may be configured to provide signalling to the presentation apparatus 103 of the first consumer user 301 to re-present the second content 203 based on the consumer user location information being indicative that the first consumer user 301 is within the second spatial region while the current location of the presenter location information is indicative of the presenter user 201 being within one of the spatial regions (in this example the third spatial region 207) of the presentation data other than the second spatial region 206 and having previously been in the second spatial region 206. Accordingly, the presentation of the at least first and second content may be independent of the location of the consumer user(s) when presented for the first time, which as explained previously is based on the current location of the presenter user, and, thereafter, the determination that the location of one of the consumer users is within one of the spatial regions previously visited by the presenter user is configured to cause the re-presentation of the content associated with the revisited spatial region for the consumer user that revisits said spatial region.

The re-presenting of any of the instances of the content may comprise providing for presentation of the content that may have been hidden since first being presented. In one or more other examples, the revisited, second content 203 comprises content that progresses over time, such as a video or animated model, and the re-presenting of the content comprises the presenting of the content from a beginning time point of the first content. For a video this may comprise from an initial time point of the video. For an animated model this may comprise the beginning of the animation.

In the above examples, the first, second and third 202, 203, 204 content may be presented based on the presenter user 201 entering the associated spatial region. However, in other examples, the presentation of the first, second and third content may be further conditional on the path taken by the presenter user 201 through each of the spatial regions. Thus, the provision of the signalling to the presentation apparatuses 103, 104 to provide for the presentation of the second content 203 may be conditional on the presenter location information being indicative that the presenter user 201 moved from the first spatial region 205 to the second spatial region 206. Likewise, the provision of the signalling to the presentation apparatuses 103, 104 to provide for the presentation of the third content 204 may be conditional on the presenter location information being indicative that the presenter user moved from the first spatial region 205 to the second spatial region 206 and to the third spatial region 207. This may be advantageous as it may assist in presenting the content in the intended order, especially if the presenter user is moving exuberantly in the space 200 which could lead to unintended entering of the spatial regions.

For presentation data that comprises many instances of content, the space 200 may be large to accommodate the spatial regions associated with those many instances of content. The consumer users 301, 302 may be free to explore the space 200, that is they be free to acquire any location within the space 200, and they may not know where in the space 200 the presentation of the presentation data may begin. The consumer users may not know the location of the first spatial region 205/first presentation location 208. The first spatial region 205/first presentation location 208 may not be readily appreciated or indicated at all. Thus, when the presentation mode begins and the presenter user "triggers" the presentation of the first content 202, the consumer user(s) 301, 302 may be far away from the first content 202 and it may be difficult for them to locate the first content 202 or arrive at the first content 202 in time to follow the presentation.

In one or more examples, the apparatus 100 may apply a volume limit 701, 702 on the space 200 to restrict where in the space 200 the consumer users may move. Further, in one or more examples, as the presenter user 201 moves to the next spatial region, the volume limit may be relaxed and more of the space 200 may become available for exploration.

Figure 7:
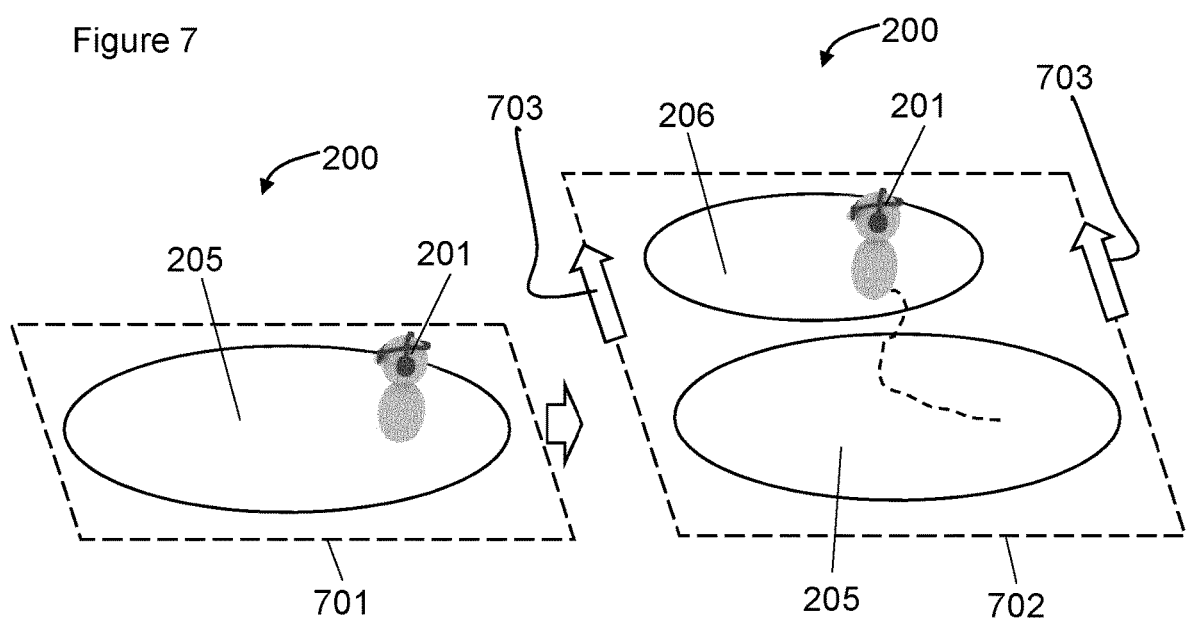
FIG. 7 shows the expanding of a spatial extent of the space from a first volume limit to a second volume limit based on the presenter user moving to a different spatial region.

Example FIG. 7 shows the expansion of the spatial extent of the space 200. Thus, on the left-hand side, the presenter user 201 is shown in the first spatial region 205. The apparatus 100 has applied a first volume limit 701 to the space 200 and therefore a consumer user (not shown) may only be free to explore the space 200 in the vicinity of the first spatial region 205. On the right-hand side, the presenter user 201 has provided input to trigger the expansion 703 of the spatial extent from the first volume limit 701 to a larger, second volume limit 702. This triggering may be provided by the presenter location information indicating that the presenter user 201 has moved to a subsequent or second spatial region 206.

Thus, to summarise, when the signalling for the presentation of the first content (not shown) is provided, the space 200 has a first volume limit 701. The first volume limit 701 comprising the spatial extent of the space 200 for the consumer users (not shown) and which includes the first presentation location 208 and not the second presentation location 209. The apparatus 100 may be configured to, if it is determined that the current location is within the second spatial region 206, provide signalling for increasing 703 the spatial extent of the virtual reality space for the consumer user (not shown) from the first volume limit 701 to a larger second volume limit 702 that includes the first presentation location and the second presentation location.

It will be appreciated that in one or more examples, the presenter user 201 may not be subject to the spatial extent limit provided by the first volume limit 701. Thus, the volume limits 701, 702 may only apply to the space 200 as presented by the presentation apparatuses 103, 104.

Figure 8:
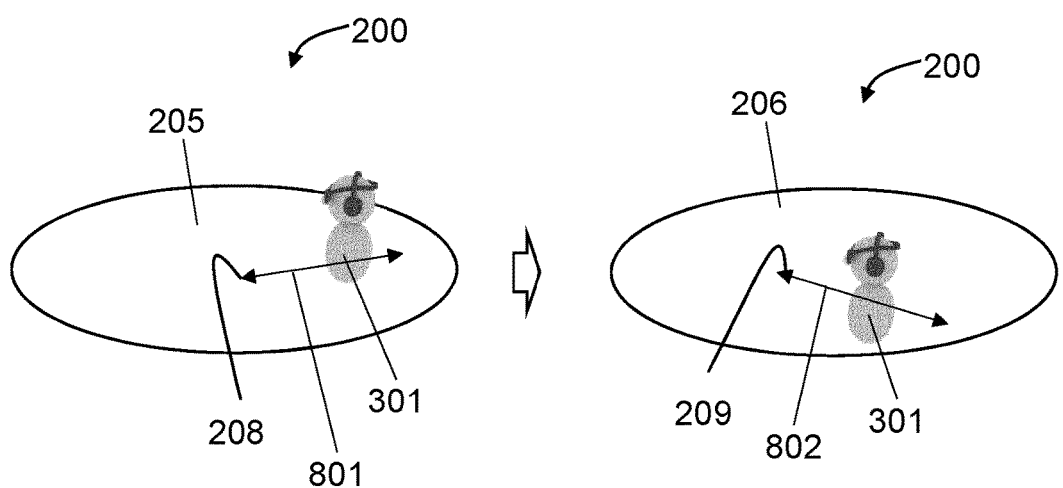
FIG. 8 shows the changing of the space based on the presenter user moving to a different spatial region.

Example FIG. 8 shows an alternative to the application of a volume limit on the space 200. On the left-hand side of FIG. 8 the presenter user (not shown) is in the first spatial region 205. The first consumer user 301 is also placed in the first spatial region 205 so that they can readily appreciate the first content (not shown). On the right-hand side of FIG. 8 the presenter user (not shown) has moved to the second spatial region 206. The first consumer user 301 is then teleported e.g. virtually moved to be placed in the second spatial region 206 so that they can readily appreciate the second content (not shown). Thus, in this example, the space 200 may be small and the content of the space, for the consumer user(s) changes around them as the presenter user moves from spatial region to spatial region. This example may be advantageous if real-world space is limited because the consumer users do not have to move, such as by sensed physical movement in the real-world space, to affect a movement in virtual reality. Instead, the space 200 changes around them to place them near the next first, second or third content.

Thus, in one or more examples, said signalling for the presentation of the first content is configured to position a virtual location of the at least one consumer user within a threshold distance 801 of the first presentation location; and said signalling for the presentation of the second content is configured to position the virtual location of the at least one consumer user within a threshold distance 802 of the second presentation location.

As mentioned previously, the functionality of the apparatus 100 has application in augmented reality as well as virtual reality, and, accordingly, the space 200 would comprises a real-world space around each of the presenter user 201 and the consumer user 301, 302. Thus, while in virtual reality the space 200 may be the same virtual world in which all the users are present, in augmented reality the space comprises the augmented environment created by the presentation apparatuses 103, 104 in augmented reality around each of the consumer users 301, 302. Accordingly, the first, second and third content is presented to appear in the space around users in augmented reality for the presenter user and one or more consumer users.

In one or more examples, the respective spatial regions comprise discrete regions of the real-world space around each respective user. In one or more examples, the presenter location information is received from one or more location sensors (part of headset 102 in some examples) configured to determine the current location of the presenter user in a real-world space around them. In one or more examples, the one or more location sensors may comprise part of the apparatus 100.

Figure 9:
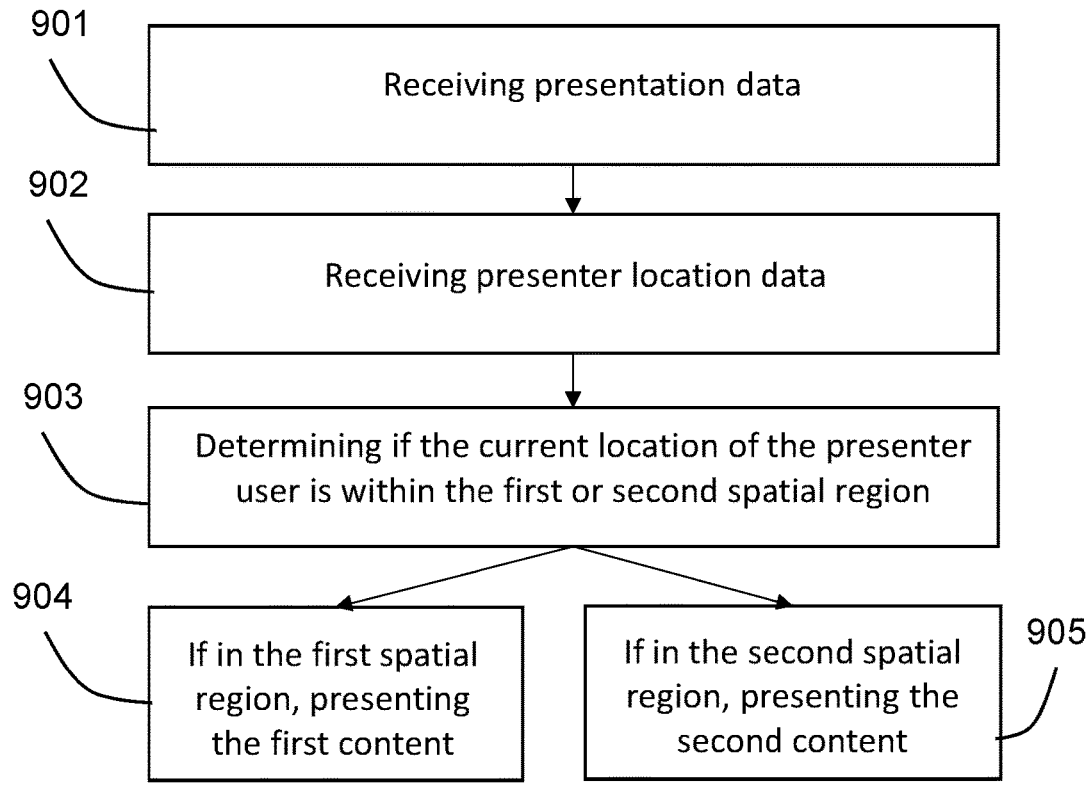
FIG. 9 shows a flowchart illustrating an example method.

FIG. 9 shows a flow diagram illustrating the steps of,
receiving presentation data 901 comprising at least first content and second content for consecutive presentation, the first content and the second content associated with a respective first and second spatial region that comprises a different part of a space and a respective first and second presentation location that comprise a different location in the space;
receiving presenter location information 902 indicative of a current location of a presenter user in the space;
determining 903, from the presenter location information, if the current location of the presenter user is within at least one of the first or second spatial region;
if it is determined that the current location is within the first spatial region, providing signalling 904 to at least one presentation apparatus for the presentation of the first content at the first presentation location by the at least one presentation apparatus, the presentation apparatus configured to present the first content to a consumer user, different to the presenter user, in one of virtual reality or augmented reality;
if it is determined that the current location is within the second spatial region, providing signalling 905 to the at least one presentation apparatus for the presentation of the second content at the second presentation location by the at least one presentation apparatus, the presentation apparatus configured to present the second content to the consumer user, different to the presenter user, in the one of virtual reality or augmented reality; and
wherein the presentation of the first content is independent of the location of the consumer users and the presentation of the second content is independent of the location of the consumer users.

Figure 10:
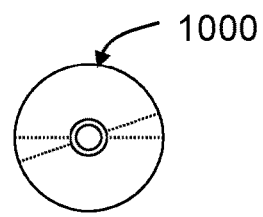
FIG. 10 shows a computer readable medium.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one non-transitory memory including computer program code,
   the at least one memory and the computer program code configured to, with the at least one processor, cause the apparatus to perform at least the following:
   receiving presentation data comprising at least first content and second content for consecutive presentation triggered with a current location of a presenter user, the first content and the second content associated with a first spatial region and a second spatial region, respectively, that respectively comprise different parts of a space, the first content and the second content associated with a first presentation location and a second presentation location, respectively, that comprise different locations in the space;
   receiving presenter location information indicative of the current location of the presenter user in the space;
   determining, from the presenter location information, whether the current location of the presenter user is within at least one of the first spatial region or the second spatial region;
   in response to determining that the current location is within the first spatial region, providing signalling to at least one presentation apparatus for presentation of the first content at the first presentation location with the at least one presentation apparatus, the at least one presentation apparatus configured to present the first content to at least one consumer user in at least one of virtual reality or augmented reality, wherein the at least one consumer user is different from the presenter user;

in response to determining that the current location is within the second spatial region, providing signalling to the at least one presentation apparatus for presentation of the second content at the second presentation location with the at least one presentation apparatus, the at least one presentation apparatus configured to present the second content to the at least one consumer user in the at least one of virtual reality or augmented reality; and wherein the presentation of the first content is independent of a location of the at least one consumer user and the presentation of the second content is independent of the location of the at least one consumer user.

2. The apparatus of claim 1, wherein the space comprises a virtual reality space for presentation to the presenter user and the at least one consumer user in virtual reality.

3. The apparatus according to claim 2, wherein the apparatus is further configured to perform:
providing for presentation of the virtual reality space for the presenter user.

4. The apparatus of claim 2, wherein said signalling for the presentation of the first content is configured to position a virtual location of the at least one consumer user within a threshold distance of the first presentation location; and
said signalling for the presentation of the second content is configured to position the virtual location of the at least one consumer user within the threshold distance of the second presentation location.

5. The apparatus of claim 1, wherein the apparatus is configured to, in response to determining that the current location is not within the first spatial region or the second spatial region, perform at least one of the following:
not providing signalling to present any further instances of the first content or the second content that has not already been presented with the at least one presentation apparatus; or
providing signalling to the at least one presentation apparatus for removing at least one of the first content or the second content from presentation.

6. The apparatus of claim 1, wherein the space comprises a virtual reality space for presentation to the presenter user and the at least one consumer user in virtual reality,
wherein the virtual reality space, in response to the signalling for the presentation of the first content, has a first volume limit, the first volume limit comprising a spatial extent of the virtual reality space for the at least one consumer user, wherein the first volume limit includes the first presentation location and not the second presentation location,
wherein, in response to the current location being within the second spatial region, the apparatus is configured to perform:
providing signalling for increasing the spatial extent of the virtual reality space for the at least one consumer user from the first volume limit to a larger second volume limit that includes the first presentation location and the second presentation location.

7. The apparatus of claim 6, wherein the virtual reality space for the presenter user is not subject to the spatial extent provided with the first volume limit.

8. The apparatus of claim 1, wherein the apparatus is configured to perform:
providing signalling to the at least one presentation apparatus of one of the at least one consumer user to re-present the first content based on consumer user location information indicative that said one of the at least one consumer user is within the first spatial region while the current location specified with the presenter location information is indicative of the presenter user being outside the first spatial region and having previously been in the first spatial region.

9. The apparatus of claim 8, wherein the first content comprises content that progresses over time and the re-presenting of the first content comprises presenting of the first content from a beginning time point of the first content.

10. The apparatus of claim 1, wherein the apparatus is configured to perform:
receiving audio data from a microphone, the microphone for use with the presenter user;
determining, from the presenter location information, one of the first or second spatial regions with which to associate the audio data;
receiving consumer user location information indicative of respective locations of the at least one consumer user in the space; and
one or both of:
providing for live presentation of the audio data using the at least one presentation apparatus of the at least one consumer user determined, using the consumer user location information, to be in a spatial region associated with the audio data at the time the audio data is received; or
providing for recording of the audio data and subsequently providing for presentation of the recorded audio data using the at least one presentation apparatus of the at least one consumer user based on the consumer user location information being indicative that the at least one consumer user has entered the spatial region associated with the audio data.

11. The apparatus of claim 1, wherein the provision of the signalling to the at least one presentation apparatus to provide for the presentation of the second content is conditional on the presenter location information being indicative that the presenter user moved from the first spatial region to the second spatial region.

12. The apparatus of claim 1, wherein the apparatus is configured to perform:
providing conferencing between a virtual reality apparatus for use with the presenter user and the at least one presentation apparatus for use with the at least one consumer user, said conferencing comprising shared presentation of the presentation data in virtual reality.

13. The apparatus of claim 1, wherein the space comprises a real-world space around the presenter user and the at least one consumer user in which to present the first content and the second content in augmented reality for the presenter user and the at least one consumer user.

14. A method, the method comprising:
receiving presentation data comprising at least first content and second content for consecutive presentation triggered with a current location of a presenter user, the first content and the second content associated with a first spatial region and a second spatial region, respectively, that respectively comprise different parts of a space, the first content and the second content associated with a first presentation location and a second presentation location, respectively, that comprise different locations in the space;

receiving presenter location information indicative of the current location of the presenter user in the space;

determining, from the presenter location information, whether the current location of the presenter user is within at least one of the first spatial region or the second spatial region;

in response to determining that the current location is within the first spatial region, providing signalling to at least one presentation apparatus for presentation of the first content at the first presentation location with the at least one presentation apparatus, the at least one presentation apparatus configured to present the first content to at least one consumer user in at least one of virtual reality or augmented reality, wherein the at least one consumer user is different from the presenter user;

in response to determining that the current location is within the second spatial region, providing signalling to the at least one presentation apparatus for presentation of the second content at the second presentation location with the at least one presentation apparatus, the at least one presentation apparatus configured to present the second content to the at least one consumer user in the at least one of virtual reality or augmented reality; and wherein the presentation of the first content is independent of a location of the at least one consumer user and the presentation of the second content is independent of the location of the at least one consumer user.

15. The method of claim 14, wherein the space comprises a virtual reality space for presentation to the presenter user and the at least one consumer user in virtual reality.

16. The method of claim 14 wherein, in response to determining that the current location is not within the first spatial region or the second spatial region, performing at least one of the following:

not providing signalling to present any further instances of the first content or the second content that has not already been presented with the at least one presentation apparatus; or providing signalling to the at least one presentation apparatus for removing at least one of the first content or the second content from presentation.

17. The method of claim 14, wherein the space comprises a virtual reality space for presentation to the presenter user and the at least one consumer user in virtual reality, wherein the virtual reality space, in response to the signalling for the presentation of the first content, has a first volume limit, the first volume limit comprising a spatial extent of the virtual reality space for the at least one consumer user, wherein the first volume limit includes the first presentation location and not the second presentation location, wherein, in response to the current location being within the second spatial region, providing signalling for increasing the spatial extent of the virtual reality space for the at least one consumer user from the first volume limit to a larger second volume limit that includes the first presentation location and the second presentation location.

18. The method of claim 17, wherein the virtual reality space for the presenter user is not subject to the spatial extent provided with the first volume limit.

19. The method of claim 14, further comprising:

providing signalling to the at least one presentation apparatus of one of the at least one consumer user to re-present the first content based on consumer user location information indicative that said one of the at least one consumer user is within the first spatial region while the current location specified with the presenter location information is indicative of the presenter user being outside the first spatial region and having previously been in the first spatial region.

20. A non-transitory computer readable medium comprising program instructions stored thereon for performing at least the following:

receiving presentation data comprising at least first content and second content for consecutive presentation triggered with a current location of a presenter user, the first content and the second content associated with a first spatial region and a second spatial region, respectively, that respectively comprise different parts of a space, the first content and the second content associated with a first presentation location and a second presentation location, respectively, that comprise different locations in the space;

receiving presenter location information indicative of the current location of the presenter user in the space;

determining, from the presenter location information, whether the current location of the presenter user is within at least one of the first spatial or the second spatial region;

in response to determining that the current location is within the first spatial region, providing signalling to at least one presentation apparatus for presentation of the first content at the first presentation location with the at least one presentation apparatus, the at least one presentation apparatus configured to present the first content to at least one consumer user in at least one of virtual reality or augmented reality, wherein the at least one consumer user is different from the presenter user;

in response to determining that the current location is within the second spatial region, providing signalling to the at least one presentation apparatus for presentation of the second content at the second presentation location with the at least one presentation apparatus, the at least one presentation apparatus configured to present the second content to the at least one consumer user in the at least one of virtual reality or augmented reality; and wherein the presentation of the first content is independent of a location of the at least one consumer user and the presentation of the second content is independent of the location of the at least one consumer user.

* * * * *